United States Patent Office
2,975,187
Patented Mar. 14, 1961

2,975,187
CYANOETHYLATED OXALACTAMS

John W. Lynn, Charleston, W. Va., assignor to Union Carbide Corporation, a corporation of New York No Drawing. Filed Mar. 17, 1959, Ser. No. 799,847

5 Claims. (Cl. 260—307)

This invention relates to novel cyanoethylated oxalactams as new compositions of matter, and to processes for their production. More particularly, this invention is concerned with N-(2-cyanoethyl)-oxazolidinone-2 compounds as new compositions of mater, and with processes for their production.

The novel cyanoethylated oxalactams of this invention can be graphically depicted by the formula

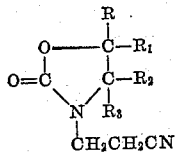

wherein R, $R_1$, $R_2$, and $R_3$ represent a hydrogen atom or a hydrocarbon radical, including alkyl radicals such as methyl, ethyl, propyl, isopropyl, butyl, isobutyl, pentyl, octadecyl and the like, cycloalkyl radicals such as cyclopropyl, cyclobutyl, cyclopentyl, cyclohexyl and the like, alkenyl radicals such as allyl, butenyl, pentenyl and the like, aryl radicals such as phenyl, naphthyl and the like, alkaryl radicals such as tolyl, xylyl, mesityl and the like, and aralkyl radicals such as benzyl, phenylethyl, phenylpropyl, diphenylmethyl and the like. Illustrative of the cyanoethylated lactams of this invention is N-(2-cyanoethyl)-oxazolidinone-2 which can be represented by the formula

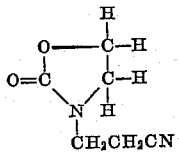

and such compounds as

N-(2-cyanoethyl)-4-methyloxazolidinone-2,
N-(2-cyanoethyl)-4-ethyl-5-cyclobutyloxazolidinone-2,
N-(2-cyanoethyl)-4-allyl-5-ethyloxazolidinone-2,
N-(2-cyanoethyl)-4-propyl-5-phenyloxazolidinone-2,
N-(2-cyanoethyl)-4-tolyl-5-allyloxazolidinone-2,
N-(2-cyanoethyl)-4-phenylethyl-5-methyloxazolidinone-2,
N-(2-cyanoethyl)-4,5-dimethyloxazolidinone-2,
N-(2-cyanoethyl)-4,5-diallyl-4,5-dimethyloxazolidinone-2,
N-(2-cyanoethyl)-4-propyl-5-phenyloxazolidinone-2,
N-(2-cyanoethyl)-4-cyclobutyl-5-tolyloxazolidinone-2,
N-(2-cyanoethyl)-4,5-ditolyl-4,5-dimethyloxazolidinone-2 and the like.

The novel cyanoethylated oxalactams of this invention can be produced by forming a mixture of a ring-oxygenated lactam and acrylonitrile, and heating the mixture in the presence of a strongly alkaline catalyst at an elevated temperature to cause these starting materials to react to produce an N-(2-cyanoethyl)-oxazolidinone-2 compound.

The ring-oxygenated lactams which can be employed as starting materials in preparing the novel compounds of this invention can be graphically depicted by the formula

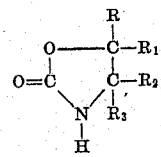

wherein R, $R_1$, $R_2$ and $R_3$ are as above defined. Illustrative of such starting materials is 2-oxazolidinone which can be represented by the formula

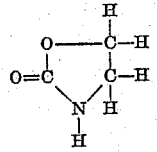

and such compounds as 4-methyloxazolidinone-2,
4-ethyl-5-cyclobutyloxazolidinone-2,
4-allyl-5-ethyloxazolidinone-2,
4-propyl-5-phenyloxazolidinone-2,
4-tolyl-5-allyloxazolidinone-2,
4-phenylethyl-5-methyloxazolidinone-2,
4,4,5,5-tetramethyloxazolidinone-2,
4,5-diallyl-4,5-dimethyloxazolidinone-2,
4-propyl-5-phenyloxazolidinone-2,
4-cyclobutyl-5-tolyloxazolidinone-2,
4,5-ditolyl-4,5-dimethyloxazolidinone-2 and the like.

The ring-oxygenated lactams which can be employed as starting materials in preparing the novel compounds of this invention can be produced by the reaction of ethanolamine, or a substituted derivative, with carbon dioxide, or an alkyl or alkylene carbonate. By way of illustration, 2-oxazolidinone can be produced by heating ethanolamine and carbon dioxide under autogenous pressure in a sealed reaction vessel. This can be illustrated by the following graphic equation.

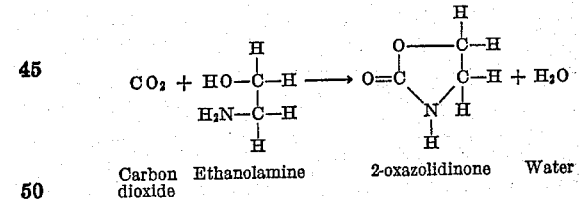

Carbon dioxide    Ethanolamine    2-oxazolidinone    Water

In like manner, carbon dioxide can be reacted with the substituted derivatives of ethanolamine to produce a wide variety of compounds useful as starting materials in the process of this invention.

The process of the instant invention comprises reacting acrylonitrile with a ring-oxygenated lactam in the presence of a strongly alkaline catalyst, and can be illustrated by the following graphic equation

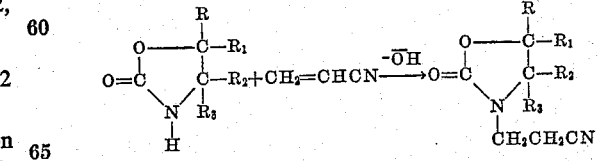

wherein R, $R_1$, $R_2$ and $R_3$ are as above defined. Thus, for example, N-(2-cyanoethyl)-oxazolidinone-2 can be prepared by the reaction of acrylonitrile with 2-oxazolidinone.

When effecting reaction according to the process of the instant invention, it is preferable to employ an excess of acrylonitrile over the stoichiometric amount required to react with the ring-oxygenated lactam present in order to drive the reaction to completion. An amount of acrylonitrile ranging from the stoichiometric equivalent to a 2:1 mole ratio has been found effective for this purpose. Greater or lesser amounts of either reactant, for example amounts ranging from as little as 0.5 mole of acrylonitrile to as much as 10 moles of acrylonitrile per mole of ring-oxygenated lactam present, can also be employed; however, such proportions of reactants do not provide the advantages obtainable by operating within the narrower range indicated above.

The catalysts which are effective in promoting reaction between acrylonitrile and a ring-oxygenated lactam according to the process of the instant invention are strongly alkaline substances. Such catalysts include the oxides, hydroxides, cyanides, amides and alcoholates of the alkali or alkaline earth metals, as well as the alkali or alkaline earth metals themselves, and such strongly basic non-metallic hydroxides as the quaternary ammonium hydroxides. Specific examples of the catalysts which can be employed include sodium hydroxide, potassium hydroxide, lithium hydroxide, sodium oxide, sodamide, potassium ethylate, sodium cyanide, potassium carbonate, potassium tertiary amylate, trimethylbenzylammonium hydroxide, benzyltriethylammonium hydroxide, and dimethyldibenzylammonium hydroxide.

The amount of catalyst employed in promoting reaction according to the process of the instant invention should be sufficient to impart a pH of at least 8 to the reaction mixture. Preferably, the pH of the reaction mixture should be maintained between 8 and 12, although any pH above 8 can be employed.

Reaction according to the process of the instant invention readily occurs at temperatures ranging from as low as 10° C. to as high as 100° C. Preferably, reaction is effected at temperatures ranging from about 30° C. to about 50° C. Temperatures both above and below the broadly disclosed range can also be employed; however, such temperatures do not provide the advantages obtainable by operating within the temperature range indicated above.

Atmospheric pressure is usually employed in effecting reaction according to the process of the instant invention. However, pressures both above and below atmospheric pressure, for example pressures ranging from as low as 400 mm. Hg to as high as 1000 p.s.i.g., can also be employed whenever it is desirable to do so.

The preparation of cyanoethylated oxalactams according to the process of the instant invention may be effected in an inert liquid solvent. By an "inert" liquid solvent is meant a liquid solvent in which the starting materials are soluble to an extent whereby they are brought into reactive contact and which itself is non-reactive under the conditions of the reaction. Suitable inert liquid solvents which can be employed for such purpose include hydrocarbons such as hexane, cyclohexane, heptane, benzene, toluene and the like, and ethers such as dioxane, tetrahydrofuran and the like. In general, an amount of solvent ranging from 0 to about 10 times, preferably from 0 to 5 times, the weight of reactants present can be effectively employed. Greater amounts of solvent can also be employed; however, such amounts of solvent do not provide the advantages obtainable by operating within the range indicated.

Reaction is preferably effected according to the process of the instant invention by dissolving the ring-oxygenated lactam in a suitable inert solvent, adding a strongly alkaline catalyst to the resulting solution in order to raise the pH thereof to at least 8, and then gradually and slowly adding acrylonitrile thereto with constant stirring. Preferably the reaction mixture is maintained at a temperature of from about 30° C. to about 50° C. both during the addition of acrylonitrile and for some time thereafter, for example for from 1 to 5 hours.

The cyanoethylated oxalactams of this invention are useful as insecticides, being particularly effective as a poison bait for houseflies when mixed with sugar.

The following examples illustrate the preparation of materials which can be employed in preparing cyanoethylated oxalactams in accordance with the process of the instant invention.

EXAMPLE I

*Preparation of 2-oxazolidinone*

To 440 grams of ethylene carbonate (5 moles), maintained at a temperature of 50–60° C. by cooling, were added 305 grams of monoethanolamine (5 moles). After the addition of 2 grams of sodium methoxide, the resulting mixture was then heated at 140° C. for a period of several hours. Following this, 281 grams of ethylene glycol, boiling at a temperature of 80–90° C. at 5 mm. Hg, were removed from the mixture by distillation. The remaining residue was allowed to cool and was then crystallized from chloroform. About 154 grams of 2-oxazolidinone were recovered in this manner. This represented a yield of about 35 percent of theoretical. This material had a melting point of 88–89° C.

EXAMPLE II

*Preparation of 2-oxazolidinone*

To a stainless steel autoclave were charged 244 grams of ethanolamine (4 moles) and 352 grams of carbon dioxide (8 moles). The autoclave was sealed and heated at a temperature of 135° C. and at a pressure of 1000 p.s.i.g. for a period of seven hours. Following this, the autoclave was drained and 220 grams of monoethanolamine were removed by distillation. The remaining residue was allowed to cool and solidify, and was then crystallized from acetone. About 36 grams of 2-oxazolidinone were recovered in this manner. This represented a yield of about 10.3 percent of theoretical. This material had a melting point of 90–90.5° C.

*Analysis.*—Calculated for $C_3H_5NO_2$: N, 16.1%. Found: N, 16.08%.

The following examples of my invention are set forth for purposes of illustration so that those skilled in the art may better understand my invention and it should be understood that they are not to be construed as limiting my invention in any manner.

EXAMPLE III

*Preparation of N-(2-cyanoethyl)-oxazolidinone-2*

An admixture of 87 grams of 2-oxazolidinone (1 mole), 250 ml. of benzene, and 4 grams of a 50% solution of sodium hydroxide in water was prepared and maintained at a temperature of from 50° C. to 60° C. by heating while 58 grams of acrylonitrile (1.1 moles) were added over a period of one-half hour. After the addition of acrylonitrile was complete, the mixture was heated at 50° C. for an additional two hours. After cooling, sulfuric acid was added to the mixture until the pH of the resulting mixture was lowered to approximately 2. The precipitate obtained by this procedure was then removed by filtration and the filtrate obtained thereby was stripped of solvent by distillation under reduced pressure. About 130 grams of N-(2-cyanoethyl)-2-oxazolidinone were recovered. This represented a yield of about 93 percent of theoretical. This material, a yellow oil, had the following properties: $n_D^{30°}$ 1.4755, $d$ 20/20 1.2310, and was identified by chemical analysis.

*Analysis.*—Calculated for $C_6H_8N_2O_2$: C, 51.1%; H, 5.7%; N, 20.0%. Found: C. 49.9%; H, 5.7%; N, 19.7%.

EXAMPLE IV

*Test of N-(2-cyanoethyl)-oxazolidinone-2 as poison bait for houseflies*

Into a metal dish 1.5 inches in diameter and 0.25 inch in height were placed a 1.5 inch square piece of absorbent cotton (about 0.25 inch in height) and 15 ml. of a test solution prepared by admixing 250 mg. of N-(2-cyanoethyl)-oxazolidinone-2, 10 ml. of acetone, 6 mg. of a polyethylene glycol terminated at one end with octylphenoxy and nonylphenoxy groups and 100 ml. of a 10 percent by weight solution of sugar in water. A seven-inch square piece of blotting paper was then rested atop the absorbent cotton and the sides of the metal dish.

Twenty-five adult houseflies, including both males and females, were immobilized by placing a rearing cage containing the insects in a refrigerated room maintained at a temperature of 0.5° C. The insects were then placed in test cages arranged so that the blotting paper projected into the cages. After a period of 24 hours at room temperature, 50 percent of the flies in the dish had been killed.

Unless otherwise specified, all parts and percentages, as used throughout this specification, are by weight.

What is claimed is:

1. N-(2-cyanoethyl)-oxazolidinone-2.

2. A process for producing N-(2-cyanoethyl)-oxazolidinone-2 which comprises forming a mixture of acrylonitrile, 2-oxazolidinone, and an inert liquid solvent, and heating the mixture in the presence of a strongly alkaline catalyst, said catalyst being present in an amount sufficient to impart a pH of at least 8 to the reaction mixture, at a temperature of from 10° C. to 100° C. to cause said acrylonitrile and said 2-oxazolidinone to react to produce said N-(2-cyanoethyl)-oxazolidinone-2.

3. The cyanoethylated oxalactams represented by the general formula

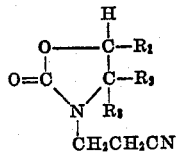

wherein R, $R_1$, $R_2$ and $R_3$ are radicals such that the cyanoethylated oxalactams are selected from the group consisting of N-(2-cyanoethyl)-oxazolidinone-2,
N-(2-cyanoethyl)-4-methyloxazolidinone-2,
N-(2-cyanoethyl)-4-ethyl-5-cyclobutyloxazolidinone-2,
N-(2-cyanoethyl)4-allyl-5-ethyloxazolidinone-2,
N-(2-cyanoethyl)-4-propyl-5-phenyloxazolidinone-2,
N-(2-cyanoethyl)-4-tolyl-5-allyloxazolidinone-2,
N-(2-cyanoethyl)-4-phenylethyl-5-methyloxazolidinone-2,
N-(2-cyanoethyl)-4,5-dimethyloxazolidinone-2,
N-(2-cyanoethyl)-4,5-diallyl-4,5-dimethyloxazolidinone-2,
N-(2-cyanoethyl)-4-propyl-5-phenyloxazolidinone-2,
N-(2-cyanoethyl)-4-cyclobutyl-5-tolyloxazolidinone-2, and
N-(2-cyanoethyl) - 4,5 - ditolyl - 4,5 - dimethyloxazolidinone-2.

4. A process for producing cyanoethylated oxalactams represented by the general formula

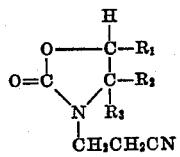

wherein R, $R_1$, $R_2$ and $R_3$ are radicals such that the cyanoethylated oxalactams are selected from the group consisting of N-(2-cyanoethyl)-oxazolidinone-2,
N-(2-cyanoethyl)-4-methyloxazolidinone-2,
N-(2-cyanoethyl)-4-ethyl-5-cyclobutyloxazolidinone-2,
N-(2-cyanoethyl)-4-allyl-5-ethyloxazolidinone-2,
N-(2-cyanoethyl)-4-propyl-5-phenyloxazolidinone-2,
N-(2-cyanoethyl)-4-tolyl-5-allyloxazolidinone-2,
N-(2-cyanoethyl)-4-phenylethyl-5-methyloxazolidinone-2,
N-(2-cyanoethyl)-4,5-dimethyloxazolidinone-2,
N-(2-cyanoethyl)-4,5-diallyl-4,5-dimethyloxazolidinone-2,
N-(2-cyanoethyl)-4-propyl-5-phenyloxazolidinone-2,
N-(2-cyanoethyl)-4-cyclobutyl-5-tolyloxazolidinone-2, and
N-(2-cyanoethyl)-4,5-ditolyl-4,5-dimethyloxazolidinone-2;

which comprises forming a mixture of acrylonitrile and a ring-oxygenated lactam selected from the group consisting of 2-oxazolidinone,
4-methyloxazolidinone-2,
4-ethyl-5-cyclobutyloxazolidinone-2,
4-allyl-5-ethyloxazolidinone-2,
4-propyl-5-phenyloxazolidinone-2,
4-tolyl-5-allyloxazolidinone-2,
4-phenylethyl-5-methyloxazolidinone-2,
4,5-dimethyloxazolidinone-2,
4,5-diallyl-4,5-dimethyloxazolidinone-2,
4-propyl-5-phenyloxazolidinone-2,
4-cyclobutyl-5-tolyloxazolidinone-2, and
4,5-ditolyl-4,5-dimethyloxazolidinone-2, and heating the mixture in the presence of a strongly alkaline catalyst at an elevated temperature to cause said acrylonitrile and said ring-oxygenated lactam to react to produce said cyanoethylated oxalactams.

5. A process for producing cyanoethylated oxalactams represented by the general formula

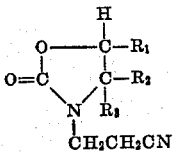

wherein R, $R_1$, $R_2$ and $R_3$ are radicals such that the cyanoethylated oxalactams are selected from the group consisting of N-(2-cyanoethyl)-oxazolidinone-2,
N-(2-cyanoethyl)-4-methyloxazolidinone-2,
N-(2-cyanoethyl)-4-ethyl-5-cyclobutyloxazolidinone-2,
N-(2-cyanoethyl)-4-allyl-5-ethyloxazolidinone-2,
N-(2-cyanoethyl)-4-propyl-5-phenyloxazolidinone-2,
N-(2-cyanoethyl)-4-tolyl-5-allyloxazolidinone-2,
N-(2-cyanoethyl)-4-phenylethyl-5-methyloxazolidinone-2,
N-(2-cyanoethyl)-4,5-dimethyloxazolidinone-2,
N-(2-cyanoethyl)-4,5-diallyl-4,5-dimethyloxazolidinone-2,
N-(2-cyanoethyl)-4-propyl-5-phenyloxazolidinone-2,
N-(2-cyanoethyl)-4-cyclobutyl-5-tolyloxazolidinone-2, and
N-(2 - cyanoethyl) - 4,5 - ditolyl - 4,5 - dimethyloxazolidinone-2;

which comprises forming a mixture of acrylonitrile and a ring-oxygenated lactam selected from the group consisting of 2-oxazolidinone,
4-methyloxazolidinone-2,
4-ethyl-5-cyclobutyloxazolidinone-2,
4-allyl-5-ethyloxazolidinone-2,
4-propyl-5-phenyloxazolidinone-2,
4-tolyl-5-allyloxazolidinone-2,
4-phenylethyl-5-methyloxazolidinone-2,
4,5-dimethyloxazolidinone-2,
4,5-diallyl-4,5-dimethyloxazolidinone-2,
4-propyl-5-phenyloxazolidinone-2,
4-cyclobutyl-5-tolyloxazolidinone-2, and
4,5-ditolyl-4,5-dimethyloxazolidinone-2, and heating the mixture in the presence of a strongly alkaline catalyst, said catalyst being present in an amount sufficient to impart a pH of at least 8 to the reaction mixture, at an elevated temperature to cause said acrylonitrile and said ring-oygenated lactam to react to produce said cyanoethylated oxalactams.

No references cited.